United States Patent
Goodman

[11] 4,001,745
[45] Jan. 4, 1977

[54] INTRUSION DETECTION TRANSDUCER

[75] Inventor: Roger John Goodman, Wayzata, Minn.

[73] Assignee: Honeywell Inc., Minneapolis, Minn.

[22] Filed: June 5, 1975

[21] Appl. No.: 584,245

[52] U.S. Cl. .................................. 336/20; 336/147; 336/180; 340/38 R; 340/258 C; 340/261
[51] Int. Cl.$^2$ .................. H01F 21/06; H01F 27/28
[58] Field of Search ........... 340/38 R, 38 L, 258 C, 340/272, 261; 336/20, 180, 181, 170, 171, 145, 146, 147; 323/48, 49; 335/215

[56] References Cited
UNITED STATES PATENTS

| | | | |
|---|---|---|---|
| 3,634,843 | 1/1972 | Corris | 340/258 C X |
| 3,736,502 | 5/1973 | Schonstedt | 340/258 C X |

*Primary Examiner*—Thomas J. Kozma

[57] ABSTRACT

A transducer including a central core extending along one axis and having a length along the axis defined as $xl$, where $x$ is at least two and $l$ is any given length. Surrounding the central core are a plurality of $n$ wires, where $n$ is an even integer of four or more. Each of said wires is wound around different portions of the core to form $x$ numbers of coils of a length of $l/n$. These coils are a distance of $l$ apart, center to center. Appropriate packaging of this transducer permits burial. The ends of the transducer may be connected to electronic analyzing equipment for processing of signals generated by objects approaching the transducer.

16 Claims, 7 Drawing Figures

INTRUSION DETECTION TRANSDUCER

BACKGROUND OF THE INVENTION

Intrusion detection is becoming more important, both from a military standpoint and from a commercial activity. Military bases and installations, factories, power stations, stores and even private homes are being protected by sophisticated electronic surveilance systems which are capable of monitoring the periphery of the facility so as to warn against unwanted intrusion.

One type of intrusion detection which has become more important in this security conscious world is that where a sensing element is concealed in the ground around the outer edges of an area to be protected. The sensing element, of whatever type, is adapted to monitor the movement of persons or objects approaching the outer edge, usually producing a signal indicating such an intrusion.

To enhance the value of any intrusion detection system, it is desirable that the sensor be able to detect more than one form of intrusion. Specifically, magnetic intrusion is normally detected, such as for example, by detection of a mass of metal which breaks through or encroaches upon a magnetic field. Objects which might be detected by these devices are obvious metal products such as vehicles, weapons, tools and the like. Examples of patents which disclose sensors capable of detecting intrusion by metallic objects are U.S. Pat. No. 3,747,036 and U.S. Pat. No. 3,754,223.

While detection of intrusion of the aforementioned type is likely to give a reasonable degree of assurance, additional protection is desirable if it can be achieved without greatly increasing costs and technical difficulties. Obviously, watchmen or sentries can be placed around an area to be guarded, but this is an expensive and not always reliable safeguard. Remote control cameras and other visual sensors bring about additional costs. It would be desirable if an intrusion detection sensor could be developed which would permit the use of already existing magnetic detection apparatus. It would be particularly desirable if intrusion could be determined by recognition of pressure and/or seismic disturbances so as to intercept and detect nonmetallic objects moving across the line to be guarded.

Accordingly, it is an object of this invention to provide a transducer capable of recognizing both seismic and pressure signals.

Another object of this invention is to provide a transducer which is compatible with magnetic intrusion detection systems and which produces a signal responsive to both seismic and magnetic intrusion.

Yet another object of this invention is to provide a transducer for intrusion detection which is capable of being adjusted to vary the degree of sensitivity, so that the particular sensitivity can be selected for the particular use in mind.

Other objects will appear hereinafter.

DESCRIPTION OF THE INVENTION

It has now been discovered that the above and other objects of the present invention can be accomplished in the following manner. Specifically, a new transducer has been discovered, which includes a central core extending along an axis having a length along that axis defined as $xl$. X is an integer of at least two and $l$ is a given length. As will be explained further hereinafter, the length $l$ is selected to give an appropriate repetitive length for the cable while $x$ represents the number of times that the appropriate length is repeated.

Surrounding the cable are a plurality of wires, $n$ in number, where $n$ is an even integer of four or more. Particularly preferred are four or six wires. Each of the $n$ different wires are wound around different portions of the core to form coils. Each wire is wound to form $x$ number of coils which are a distance of apart from one another, center to center, and are a length equal to $l/n$.

In a preferred embodiment of this invention, the core itself is formed from a magnetostrictive material such as Permalloy. A preferred minimum magnetostrictive coefficient is at least $1 \times 10^{-6}$.

In one embodiment of the present invention, it is preferred that the core be a flat solid core having a substantial width to thickness ratio, such as in the order of at least eight to one. Alternatively, another embodiment of this invention provides for a core which comprises a plurality of magnetostrictive wires woven together to form a substantially round core of significantly greater diameter than the diameter of the individual wires. Typical lengths of both types of cables may range to as great as 100 meters or more. It is preferable to construct a transducer wherein $x$ is at least 20 and $l$ ranges from ½ to 4 meters.

Normally, the transducer of the present invention is intended to be buried in the ground or otherwise positioned so as to be located in an environment which necessitates some protection of the core from the environment. It is a preferred embodiment that the transducer include a jacketing means surrounding the coils on the core for preventing contact of the coils with the external environment. One preferred jacketing means, particularly suitable for use with the flat core having a substantial width to thickness includes a pair of flat portions covering the coils across the width of the core and end portions joining the pair of flat portions at both edges of the core, said end portions having at least a part thereof perpendicular to the first portion. This portion which is perpendicular enhances flexibility of the cable to permit ease of installation. The jacketing means may be adjusted to maintain a predetermined pressure on the core through the coils. This is desirable, as will be explained hereinafter, to prevent unwanted vibration of the core in the coils.

In the case of a round cable, the jacketing means may be comprised merely of a wrapping of impervious material which is wrapped around the coils on the core to prevent contact of the coils with external environment and to maintain a predetermined pressure on the core through the coils.

In addition, the wires themselves as they are formed into coils may be wound at a predetermined tightness to enhance magnetostrictive movement of the core. Adjustment of the pressure of the coils wrapping the core and the jacketing holding the coils to the core can be made to adjust the seismic sensitivity. For example, if the coils are too loosely surrounding the core, distant thunder or explosions far from the area being protected can cause vibration of the core in the coils, producing a magnetostrictive signal. If, on the other hand, the core is so tightly wrapped by the coils, a person walking right over the cable would not cause sufficient sensitivity to generate an adequately detectable signal.

To employ the transducer of the present invention, the ends of the wires may be connected in various manners to provide various relationships between the adjoining coils. The output from a transducer of the present invention may be connected to various intrusion detection electronic systems, such as, for example, that disclosed in U.S. Pat. No. 3,846,790.

The coils may be connected to one another in various manners. Specifically, each of the adjacent wires may be connected at their ends in series to effect sequential alternating directions of windings in the coils which are adjacent to one another. Similarly, each pair of adjacent wires may be connected at their ends in parallel and each pair of coils may be connected at their ends in series to effect sequential alternating directions of windings of pairs of adjacent coils. It is also possible to connect all of the wires at their ends in parallel to effect continuous direction of windings in the same direction for all of the coils. Finally, it is possible for each pair of adjacent wires to be connected at their opposite ends in series and each pair of coils connected at their ends in series to effect sequential alternating direction of windings of pairs of adjacent coils.

For a more complete understanding of the present invention, reference is hereby made to the drawings in which.

DETAILED DESCRIPTION OF THE DRAWINGS

Figure 1:
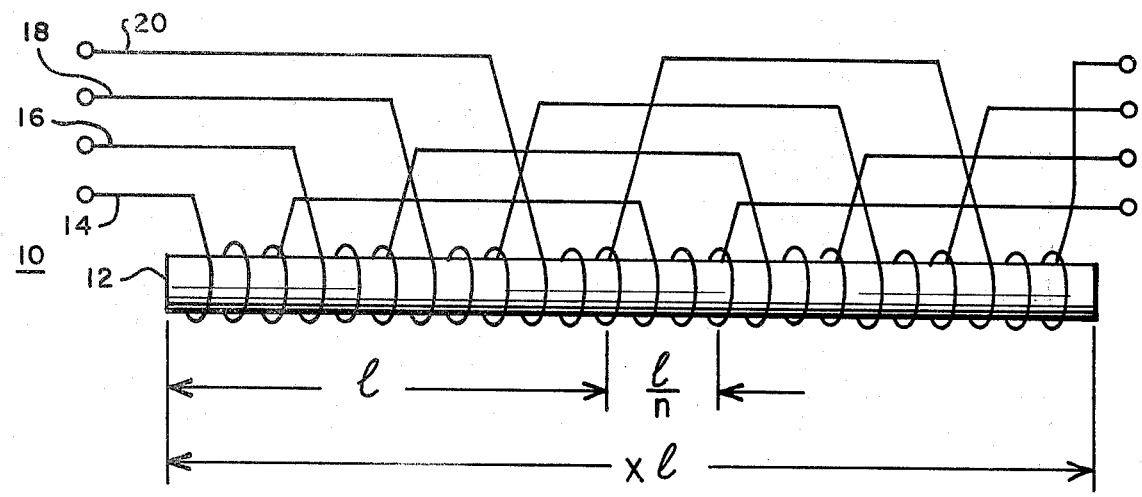
FIG. 1 represents a schematic drawing showing one embodiment of the present invention.

As shown in FIG. 1, the transducer 10 of the present invention is pictured in schematic form. A core 12 extends along an axis running from left to right in the paper. The core 12 has a length equal to $xl$, where $x$ is at least two and $l$ is a given length. In this example, $x$ is equal to two although, as indicated herein above, $x$ of at least 20 is preferred and a preferred range for $l$ is from ½ to 4 meters. In this example, there are four wires, thereby defining the number $n$ as equal to four. Line or wire 14 wraps the coil 12 on different portions of the core to form $x$ number of coils, in this case two, each having a length equal to $l/n$. These two coils are spaced a distance of $l$ apart, center to center. Similarly, wire 16 wraps the core 12 twice, as do wires 18 and 20. Thus, the entire core 12 is wrapped by the four wires 14, 16, 18 and 20 such that each of the coils are spaced a distance of $l$ apart and the entire core 12 is wrapped by coils from the four wires.

Figure 2:
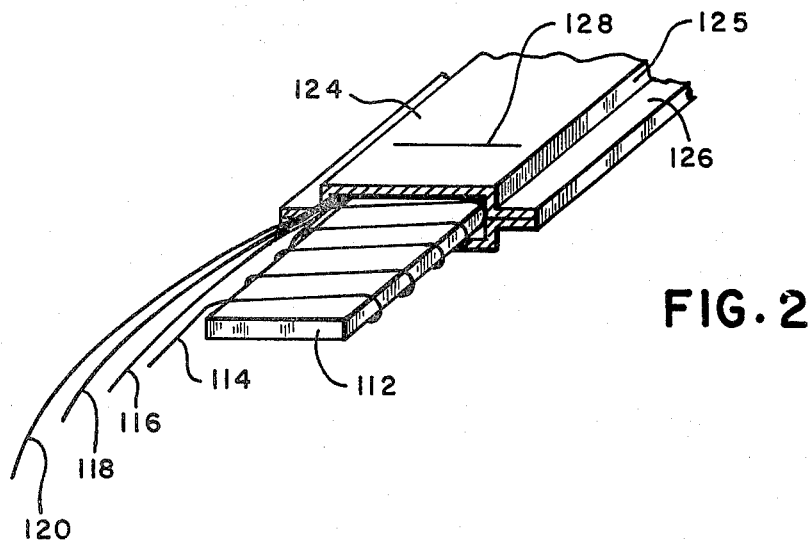
FIG. 2 is a partially sectioned cut away schematic drawing showing a preferred embodiment of the present invention.

As shown in FIG. 2, the core 112 is wrapped by a plurality of four wires, 114, 116, 118 and 120 in the manner described with reference to FIG. 1. The jacket means is provided to protect the coils wrapped around the core and includes a pair of flat portions 124 covering the coils across the width of the core 112 and end portions joining both edges 124 of the core, said end portions 126 having at least a part thereof 125 perpendicular to the first portions 124. Because of the particular configuration described, it is possible for the cable to flex or be bent along the width of the cable. Creases 128 are provided at spaced intervals along the jacket flat portions 124 to increase flexibility and assist in uniform curvature during installation. Experiments have been performed utilizing transducers as described in FIG. 2 and it has been found that the relationship of the flat or width portion of the core 112 to the surface of the earth does not particularly affect sensitivity. Thus the flat portion 124 of the jacket can be parallel to the ground in which the cable is being installed, thereby permitting the cable to adjust for rises and dips in the surface, or the flat portion 124 may be perpendicular to the surface of the earth, allowing for the cable to turn corners as it is placed around the perimeter of an area to be guarded.

Figure 3:
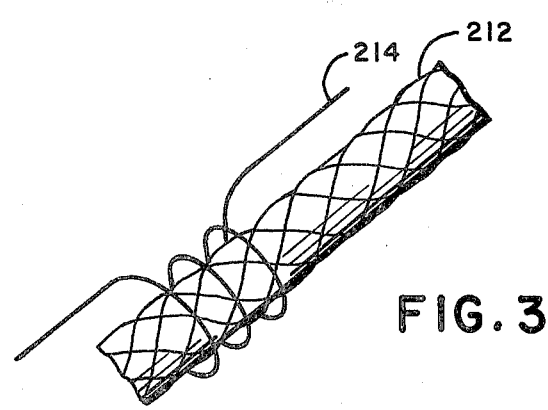
FIG. 3 is a sectioned partially cut away view of another embodiment of the present invention.

As shown in FIG. 3, a plurality of wires are woven together to form a core 212. This core is comprised of a plurality of magnetostrictive wires woven together to form a substantially round core of significantly greater diameter than the diameter of the individual wires forming the core. Again, various coils such as wire 214 are wrapped around the core 212 as described herein above.

Figure 4:
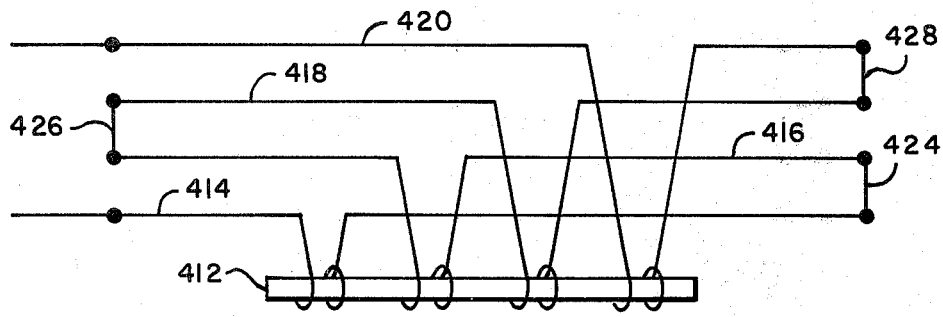
FIG. 4 is a simplified schematic drawing showing one method of interconnecting the various wires forming one embodiment of this invention.

In FIG. 4, the adjacent wires are connected at their ends in series to effect sequential alternating directions of windings in adjacent coils. Specifically, the core 412 is wrapped by wires 414, 416, 418 and 420. Wires 414 and 416 are connected at their ends through line 424. Wires 416 and 418 are connected through line 426. Finally, wires 418 and 420 are connected through line 428. Thus, if one were to trace current passing through the entire system, current would pass through wire 414 and wrap in a clockwise manner around core 112. The current would then pass through wire 416 wrapping the core 412 in a counterclockwise direction. Similarly, the clockwise rotation of wire 418 and a counterclockwise rotation in wire 420 provides a sequential alternating direction of windings in the adjacent coils.

Figure 5:
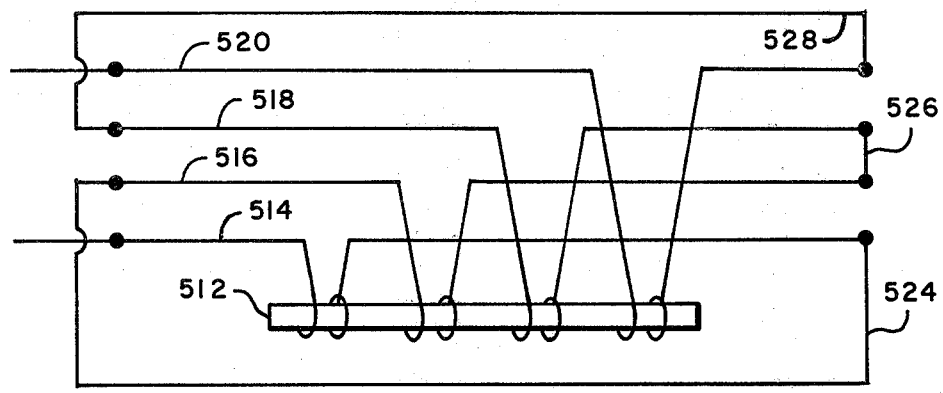
FIG. 5 is a simplified schematic drawing showing a second method for connecting the various wires, showing a second embodiment of the present invention.

As shown in FIG. 5, the same core 512 is wrapped by wires 514, 516, 518 and 520 in the same manner. However, line 524 connects lines 514 and 516 in series at their opposite ends to form a pair of coils from wires 514 and 516 which are wound about the core in the same direction. Line 526 connects wires 516 and 518 at their ends in series while line 528 connects lines 518 and 520 at their opposite ends in series. Thus the current passing through the coil passes through pairs of coils in the same direction so as to provide sequential alternating directions of windings in pairs of adjacent coils. Specifically, wires 514 and 516 provide coils in which the windings effect a clockwise direction while wires 518 and 520 provide a pair of coils in which the windings appear to be in a counterclockwise winding.

Figure 6:
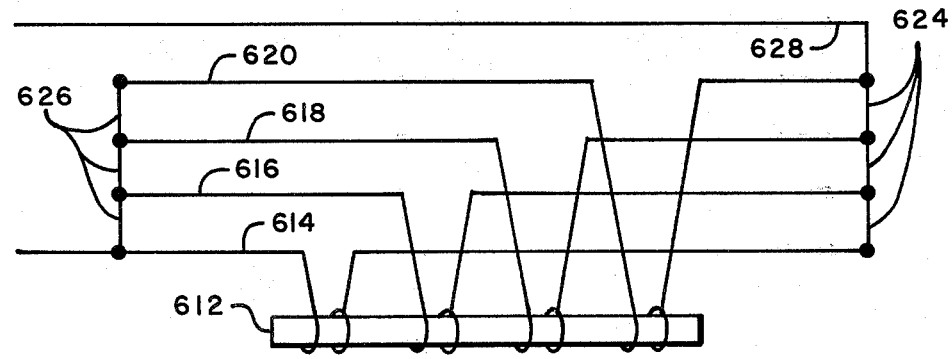
FIG. 6 is a simplified schematic drawing showing a third method for connecting the various wires, showing a third embodiment of the present invention.

In FIG. 6, the core 612 is wrapped again in the same manner by wires 614, 616, 618 and 620. Lines 624 and 626 connect the four wires in parallel at their ends to provide a continuous direction of winding in the same direction for all coils.

Figure 7:
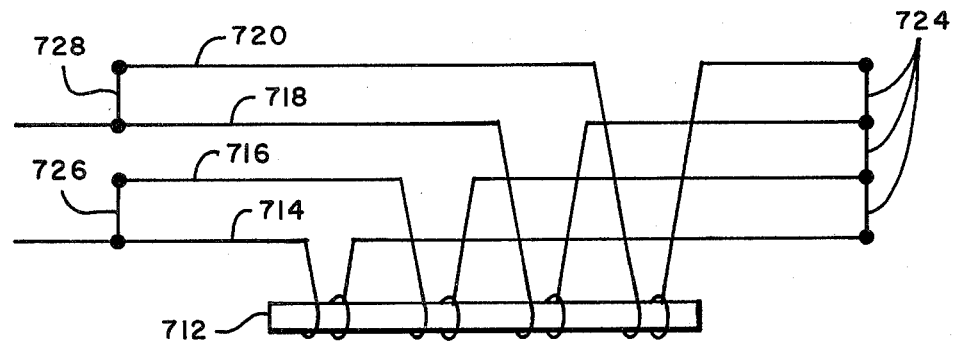
FIG. 7 is an simplified schematic drawing showing yet another method for connecting the various wires, showing a fourth embodiment of the present invention.

Finally, in FIG. 7, the core 712 is wrapped by wires 714, 716, 718 and 720 as described. Line 724 connects all of the wires in parallel at one end. Line 726 connects pairs 714 and 716 in series while 728 connects wires 718 and 720 in parallel. Line 724 further connects pairs of wires 714 and 716 in series with pairs of wires 718 and 720 to effect sequential alternating direction of pairs of coils. Therefore, current passing through the system will find wires 714 and 716 wound in a clockwise direction while pairs of wires 718 and 720 are wound in a counterclockwise direction.

As is readily apparent, the transducer of the present invention may be connected in such a manner to provide various relationships between the windings of the adjacent coils. Connection in these various ways permits different effects to be measured. Specifically, the arrangement shown in FIG. 4 provides for the maximum number of transpositions for any given length of coil. This arrangement is most sensitive to specifically pin-pointing the intrusion, and particularly is useful for intrusion by small objects such as personnel crossing the line. The arrangement as shown in FIG. 5 reduces the number of sensing areas by two, since each of the pairs of coils are connected in series. This net effect of doubling the length of the coil provides greater distance sensitivity and can be used in more remote areas where an earlier approach warning is desirable. The arrangement shown in FIG. 6 provides essentially one sensing segment extending the entire length of the transducer and will give a signal which may be processed by electronics which is significantly simpler than that required for the other arrangements herein shown. This arrangement is available as a cost saving embodiment when mere detection of intrusion is desired, without any discrimination.

Arrangement of the system in the manner shown in FIG. 7 is a compromise arrangement in which the sensitivity is less than that of the arrangement of FIG. 5 while still providing for effective segment lengths twice that of the individual segments and higher sensitivity in terms of distance from the cable than that of the simple series connection shown in FIG. 4.

The cable of the present invention may be constructed of any desired length and the relative number of transpositions may be varied for various purposes. In one example, a cable was constructed where $x$ was 40 and $l$ was approximately 2½ meters. Magnetic intrusion within 3 meters of the cable was detected when the object being detected was a person walking with a magnetic tool or weapon. In addition, the cable as just described was capable of detecting intrusion through pressure caused by compression of the soil acting upon the cable within a distance of 2 meters of the cable. Seismic disturbances, such as vibration from a motor or movement of a vehicle over rough terrain was detectable up to a distance of fifteen meters. A similar cable was employed in which the distance $l/n$ was slightly over one meter. This cable was capable of detecting magnetic intrusion of people carrying tools or weapons at a distance of slightly over one meter while still maintaining sensitivity to large vehicles such as trucks at a distance up to eight meters. Similarly, pressure intrusion such as by walking was detectable at approximately one meter and seismic intrusion caused by vibration of a large truck was noticed at distances up to approximately eight meters.

Having thus described the invention, what is claimed is:

1. A transducer, comprising:

a central core extending along an axis and having a length along said axis defined as $xl$, where $x$ is at least two and $l$ is a given length; and a plurality of $n$ wires, where $n$ is an even integer of four or more, each of said wires being wound around different portions of said core to form $x$ number of coils of a length of $l/n$ and a distance $l$ apart, center to center.

2. The device of claim 1 wherein said core is formed from a magnetostrictive material.

3. The device of claim 2 wherein said core has a magnetostrictive coefficient of at least $1 \times 10^{-6}$.

4. The device of claim 3 wherein said core comprises a flat solid core having a substantial width to thickness ratio.

5. The device of claim 3 wherein said core comprises a plurality of magnetostrictive wires woven together to form a substantially round core of a significantly greater diameter than the diameter of the individual wires.

6. The device of claim 1 wherein $x$ is at least 20 and $l$ ranges from ½ to 4 meters.

7. The device of claim 4 which further includes jacketing means surrounding said coils on said core for preventing contact of said coils with external environment.

8. The device of claim 7 wherein said jacketing means includes a pair of flat portions covering said coils across the width of said core and end portions joining said pair of flat portions at both edges of said core, said end portions having at least a part thereof perpendicular to said first portions.

9. The device of claim 8 wherein said jacketing means is adjusted to maintain a predetermined pressure on said core through said coils.

10. The device of claim 5 which further includes jacketing means surrounding said coils on said core for preventing contact of said coils with external environment.

11. The device of claim 10 wherein said jacketing means is adjusted to maintain a predetermined pressure on said core through said coils.

12. The device of claim 2 wherein said wires are wound about said core at a predetermined tightness to permit magnetostrictive movement of said core.

13. The device of claim 1 wherein adjacent wires are connected at their ends in series to effect sequential alternating directions of windings in adjacent coils.

14. The device of claim 1 wherein each pair of adjacent wires are connected at their ends in parallel and each pair of coils are connected at their ends in series to effect sequential alternating direction of winding of pairs of adjacent coils.

15. The device of claim 1 wherein all of said wires are connected at their ends in parallel to effect continuous direction of windings in the same direction of all coils.

16. The device of claim 1 wherein each pair of adjacent wires are connected at their opposite ends in series and each pair of wires are connected at their ends in series to effect sequential alternating directions of windings of pairs of adjacent coils.

* * * * *